US009647746B1

(12) United States Patent
Iwase

(10) Patent No.: US 9,647,746 B1
(45) Date of Patent: May 9, 2017

(54) RECEIVING DEVICE

(71) Applicant: Alpine Electronics, Inc., Shinagawa-ku, Tokyo (JP)

(72) Inventor: Masayuki Iwase, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/386,110

(22) Filed: Dec. 21, 2016

(30) Foreign Application Priority Data

Feb. 11, 2016 (JP) ................................. 2016-024210

(51) Int. Cl.
*H04B 17/02* (2006.01)
*H04B 7/08* (2006.01)
*H04B 17/318* (2015.01)
*H04B 1/10* (2006.01)

(52) U.S. Cl.
CPC ........... *H04B 7/084* (2013.01); *H04B 17/318* (2015.01); *H04B 2001/1072* (2013.01)

(58) Field of Classification Search
CPC .. H04B 7/0888; H04H 20/26; H04H 2201/60; H04H 40/18; H04N 21/41422; H04N 21/4263; H04N 21/6112; H04N 5/455; H04N 5/50
USPC .......... 455/3.01, 3.02, 3.06, 464, 13.3, 66.1, 455/67.13, 70, 77, 87, 562.1, 570, 125, 455/135, 139, 150.1, 160.1, 178.1, 187.1, 455/188.1, 189.1, 191.1, 193.1, 222, 220, 455/277.1, 132, 130, 179.1, 133; 370/536, 390; 375/232, 340; 348/706, 348/731, 725, 726; 725/100, 131, 151, 725/68, 347
See application file for complete search history.

(56) References Cited

U.S. PATENT DOCUMENTS

| | | | | |
|---|---|---|---|---|
| 5,768,268 A * | 6/1998 | Kline | ................... | H04B 1/0003 370/330 |
| 6,330,252 B1 * | 12/2001 | Shojima | ................. | H04H 20/33 370/390 |
| 9,362,966 B1 * | 6/2016 | Matsumoto | ........... | H03J 1/0083 |
| 2001/0033343 A1 * | 10/2001 | Yap | ...................... | G11B 27/034 348/734 |
| 2004/0085933 A1 * | 5/2004 | Wang | ....................... | H01Q 3/42 370/334 |
| 2004/0087294 A1 * | 5/2004 | Wang | ..................... | H04B 7/086 455/276.1 |

(Continued)

FOREIGN PATENT DOCUMENTS

JP 2007-060624 3/2007

*Primary Examiner* — Tan H Trinh
(74) *Attorney, Agent, or Firm* — Brinks Gilson & Lione

(57) ABSTRACT

A radio receiver includes: a plurality of tuners that receives a broadcast signal through separate antennas; phase shifters, an adder, and a phase diversity processing unit for adjusting and compositing a phase of an output signal of each tuner of the tuners; a demodulating unit that performs demodulation processing to an input signal; a noise component detecting unit that detects a predetermined noise component included in composited output of phase diversity; and a switching processing unit that sets the signal before the composition of the phase diversity to be an object to which the demodulating unit performs the demodulation processing when the detected noise component exceeds a threshold value, and sets the signal after the composition of the phase diversity to be the object to which the demodulating unit performs the demodulation processing when the noise component has not exceeded the threshold value.

18 Claims, 7 Drawing Sheets

(56) References Cited

U.S. PATENT DOCUMENTS

| | | | |
|---|---|---|---|
| 2004/0252243 A1* | 12/2004 | Stewart | H04N 5/44 348/725 |
| 2005/0020220 A1* | 1/2005 | Gamou | H04B 1/109 455/132 |
| 2005/0059370 A1* | 3/2005 | Sugiyama | H04H 40/18 455/179.1 |
| 2005/0123083 A1* | 6/2005 | Kawakami | H04B 7/0802 375/347 |
| 2006/0025097 A1* | 2/2006 | Zahm | H01Q 1/3275 455/277.1 |
| 2007/0033624 A1* | 2/2007 | Oh | H04N 5/4401 725/100 |
| 2007/0111692 A1* | 5/2007 | Kuramoto | H04B 7/0814 455/277.1 |
| 2009/0044232 A1* | 2/2009 | Narahari | H04N 5/4401 725/62 |
| 2009/0267842 A1* | 10/2009 | Takagi | H04B 1/18 343/702 |
| 2011/0134337 A1* | 6/2011 | Takiguchi | H03J 1/0008 348/731 |
| 2013/0039505 A1* | 2/2013 | Kawano | H04B 1/0007 381/71.1 |
| 2013/0135534 A1* | 5/2013 | Murakami | H04H 20/26 348/726 |
| 2013/0169881 A1* | 7/2013 | Kano | H04N 5/46 348/706 |
| 2014/0198258 A1* | 7/2014 | Ling | H04N 21/4263 348/726 |
| 2015/0085910 A1* | 3/2015 | Yokokawa | H04B 7/005 375/232 |
| 2016/0239062 A1* | 8/2016 | Lee | G06F 1/3212 |

* cited by examiner

FIG. 4

|  | S/M>S1 | S1≧S/M>S2 | S2≧S/M |
|---|---|---|---|
| USN>N1 | PD=ON | CONTINUATION | PD=OFF |
| N1≧USN>N2 | PD=ON | CONTINUATION | CONTINUATION |
| N2≧USN | PD=ON | PD=ON | PD=ON |

FIG. 8

|  | S/M>S1 | S1≧S/M>S2 | S2≧S/M |
|---|---|---|---|
| P1≧PS | PD=ON | CONTINUATION | PD=OFF |
| P2≧PS>P1 | PD=ON | CONTINUATION | CONTINUATION |
| PS>P2 | PD=ON | PD=ON | PD=ON |

FIG. 9

|  | S/M>S1 | S1≧S/M>S2 | S2≧S/M |
|---|---|---|---|
| FO>F1 | PD=ON | CONTINUATION | PD=OFF |
| F1≧FO>F2 | PD=ON | CONTINUATION | CONTINUATION |
| F2≧FO | PD=ON | PD=ON | PD=ON |

RECEIVING DEVICE

RELATED APPLICATIONS

The present application claims priority to Japanese Patent Appln. No. 2016-024210, filed Feb. 11, 2016, the entire disclosure of which is hereby incorporated by reference.

BACKGROUND

1. Field of the Disclosure

The present disclosure relates to a receiving device that receives a broadcast signal by phase diversity with a plurality of tuners.

2. Description of the Related Art

In conventional receiving devices, when a receiving intensity of a receiving signal is at or above a threshold value and a reception state is favorable, the receiving device independently operates a main tuner and a sub-tuner. When the electric field intensity is less than the threshold value and the reception state is unfavorable, the receiving device switches the main tuner and the sub-tuner into a phase diversity reception mode. An example conventional receiving device is disclosed in JP 2007-60624 A.

SUMMARY

The receiving device disclosed in JP 2007-60624 A makes a switch to phase diversity reception so as to be able to improve receiving sensitivity when the reception state degrades. However, the following two states are repeated in a region in which a broadcast signal can be barely acquired due to further degradation of the reception state. (1) A case where the broadcast signal can be acquired: phase diversity is performed so that the sensitivity can improve with respect to the broadcast signal after composition. (2) A case where the broadcast signal cannot be correctly acquired: the phase diversity is performed so that the composition is performed so as to cancel the broadcast signal. As a result, a noise component remains. When the above two states alternately occur, the following problem occurs. Sound swings in output audio intermittently occur and a sense of incongruity in audibility increases so that reception quality decreases.

The present disclosure has been made in consideration of the above problem. An object of the present disclosure is to provide a receiving device capable of inhibiting occurrence of sound swings upon degradation of a reception state and improving the reception quality.

In order to address the above problem, a receiving device includes: a plurality of tuners configured to receive a broadcast signal through separate antennas; a compositing unit configured to adjust and composite a phase of an output signal of each tune of the plurality of tuners; a demodulation processing unit configured to perform demodulation processing to an input signal; a first detecting unit configured to detect a predetermined noise component included in composited output of the compositing unit; and a switching unit configured to set the signal before the composition performed by the compositing unit to be an object to which the demodulation processing unit performs the demodulation processing when the predetermined noise component detected by the first detecting unit exceeds a first threshold value, and to set the signal after the composition performed by the compositing unit to be the object to which the demodulation processing unit performs the demodulation processing when the predetermined noise component does not exceed the first threshold value.

The compositing operation is canceled so that a state where only the noise component remains can be prevented from frequently occurring. During operation of increasing sensitivity with the composition of a weak signal component included in the broadcast signal when a reception state degrades, the broadcast signal mutually cancels due to the compositing operation and the signal after the composition includes no signal component to be demodulated and includes only the noise component remaining. As a result, sound swings are restricted from occurring so that reception quality can improve.

The receiving device may further include an electric field intensity detecting unit configured to detect electric field intensity of the above broadcast signal. The switching unit sets the signal before the composition performed by the compositing unit to be the object to which the demodulation processing unit performs the demodulation processing when the electric field intensity detected by the electric field intensity detecting unit does not exceed a second threshold value and the predetermined noise component detected by the first detecting unit exceeds the first threshold value. Accordingly, sound swings that occur when the reception electric field intensity decreases can be securely prevented from occurring.

The above predetermined noise component may be a noise component included in a side of high frequencies of a signal component to be demodulated. Particularly, the above predetermined noise component is may be ultrasonic noise being a high frequency component of a demodulation signal. When the above predetermined noise is included in the side of the high frequencies of the signal component to be demodulated (for example, the ultrasonic noise), for example, a high-pass filter can extract the predetermined noise component so that the processing can be simplified.

A receiving device according to one embodiment of the present disclosure, includes: a plurality of tuners configured to receive a broadcast signal through separate antennas; a compositing unit configured to adjust and composite a phase of an output signal of each tuner of the plurality of tuners; a demodulation processing unit configured to perform demodulation processing to an input signal; a detecting unit configured to detect a predetermined signal component included in composited output of the compositing unit; and a switching unit configured to set the signal before the composition performed by the compositing unit to be an object to which the demodulation processing unit performs demodulation processing when the predetermined signal component detected by the detecting unit does not exceed a first threshold value, and to set the signal after the composition performed by the compositing unit to be the object to which the demodulation processing unit performs the demodulation processing, in a case where the predetermined signal component exceeds the first threshold value.

When a reception state degrades and the broadcast signal mutually cancels due to compositing operation, the predetermined signal component also disappears. In this case, the compositing operation is canceled so that a state where only a noise component remains can be prevented from frequently occurring, during operation of increasing sensitivity with the composition of a weak signal component included in the broadcast signal. As a result, sound swings are inhibited from occurring so that reception quality can improve.

The receiving device may further include an electric field intensity detecting unit configured to detect electric field intensity of the above broadcast signal. The switching unit sets the signal before the composition performed by the compositing unit to be the object to which the demodulation processing unit performs the demodulation processing when the electric field intensity detected by the electric field intensity detecting unit does not exceed a second threshold value and the predetermined signal component detected by the first detecting unit does not exceed the first threshold value. Accordingly, sound swings that occur when the reception electric field intensity decreases and can be securely prevented from occurring.

The above predetermined signal component may be a pilot signal included in a broadcast signal of FM broadcasting. A distinctive signal component, such as the pilot signal included in the broadcast signal, is examined so that it can be securely determined that the signal component has disappeared from the composited output.

A receiving device according to one embodiment of the present disclosure, includes: a plurality of tuners configured to receive a broadcast signal through separate antennas; a compositing unit configured to adjust and composite a phase of an output signal of each tuner of the plurality of tuners; a demodulation processing unit configured to perform demodulation processing to an input signal; a first detecting unit configured to detect a frequency offset that is a difference between a receiving frequency set in the plurality of tuners and the frequency of the signal practically received in the plurality of tuners; and a switching unit configured to set the signal before the composition performed by the compositing unit to be an object to which the demodulation processing unit performs the demodulation processing when the frequency offset detected by the first detecting unit exceeds a first threshold value, and to set the signal after the composition performed by the compositing unit to be the object to which the demodulation processing unit performs the demodulation processing when the frequency offset does not exceed the first threshold value.

A case where the broadcast signal to be demodulated is mutually canceled due to compositing operation, is when the broadcast signal being the signal before the composition, cannot be acquired. In this case, the frequency offset being the difference between the frequency of the practically received signal and the set receiving frequency, increases. Therefore, examining the frequency offset can prevent a state where only a noise component remains, from frequently occurring, during operation of increasing sensitivity with the composition of a weak signal component included in the broadcast signal. As a result, sound swings are inhibited from occurring so that reception quality can improve.

The receiving device may further include an electric field intensity detecting unit configured to detect electric field intensity of the broadcast signal. The switching unit sets the signal before the composition performed by the compositing unit to be the object to which the demodulation processing unit performs the demodulation processing when the electric field intensity detected by the electric field intensity detecting unit does not exceed a second threshold value and the frequency offset detected by the first detecting unit exceeds the first threshold value. Accordingly, sound swings that occur when the reception electric field intensity decreases, can be securely prevented from occurring.

The receiving device may further include a control unit configured to suspend compositing operation performed by the compositing unit temporarily with predetermined repeating timing and perform separate receiving operation in each tuner of the plurality of tuners, and to resume the compositing operation performed by the compositing unit after the performance of the separate receiving operation. Even in a case where operation of performing the demodulation processing with a result of composited output of the plurality of tuners and operation of performing receiving operation individually with each of the plurality of tuners, are alternately switched, sound swings caused by the switching can be prevented.

The above switching unit may set the signal after the composition performed by the compositing unit to be the object to which the demodulation processing unit performs the demodulation processing, with predetermined timing, after setting the signal before the composition performed by the compositing unit to be the object to which the demodulation processing unit performs the demodulation processing. Alternatively, the above switching unit may set the signal after the composition performed by the compositing unit to be the object to which the demodulation processing unit performs the demodulation process when the control unit resumes the compositing operation performed by the compositing unit. Accordingly, the compositing processing can be resumed with appropriate timing after the cancellation of the compositing processing.

BRIEF DESCRIPTION OF THE DRAWINGS

FIG. 4 is a setting table illustrating a relationship between detection results acquired by an electric field intensity detecting unit and a noise component detecting unit, and the validity/invalidity of the receiving operation performed by phase diversity;

FIG. 8 is a setting table illustrating a relationship between detection results acquired by the electric field intensity detecting unit and a pilot signal detecting unit, and the validity/invalidity of the receiving operation performed by the phase diversity; and FIG. 9 is a setting table illustrating a relationship between detection results acquired by the electric field intensity detecting unit and a frequency offset detecting unit, and the validity/invalidity of the receiving operation performed by the phase diversity.

DETAILED DESCRIPTION OF THE DRAWINGS

A radio receiver according to one embodiment to which the present disclosure has been applied, will be described below with reference to the drawings.

Figure 1:
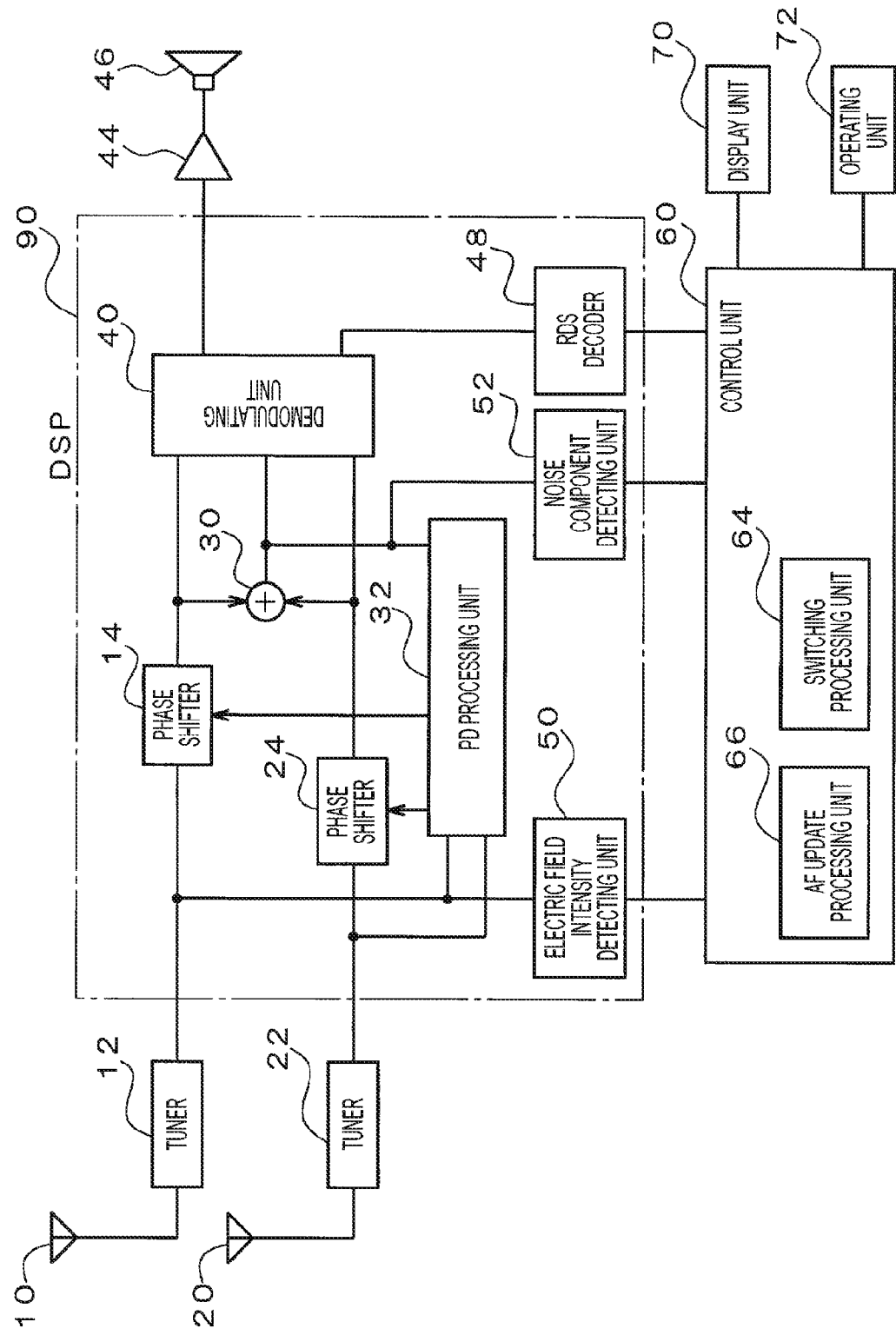
FIG. 1 is a diagram of a configuration of a radio receiver according to one embodiment.

FIG. 1 is a diagram of a configuration of the radio receiver. The radio receiver illustrated in FIG. 1 is mounted on a vehicle and receives RDS broadcasting. The radio receiver includes antennas 10 and 20, tuners 12 and 22, phase shifters 14 and 24, an adder 30, a phase diversity processing unit (PD processing unit) 32, a demodulating unit 40, an amplifier 44, a speaker 46, an RDS decoder 48, an electric field intensity detecting unit 50, a noise component detecting unit 52, a control unit 60, a display unit 70, and an operating unit 72. For example, in forms of the present disclosure, a digital signal processing processor (DSP) 90 achieves the phase shifters 14 and 24, the adder 30, the phase diversity processing unit 32, the demodulating unit 40, the RDS decoder 48, the electric field intensity detecting unit 50, and the noise component detecting unit 52, in the configuration.

The RDS broadcasting sets a frequency of 57 kHz being a third-order harmonic of a stereo pilot signal having a frequency of 19 kHz, as a sub-carrier wave, and amplitude-modulates the sub-carrier wave with a data signal, indicating data, such as program related information or traffic information, to which filtering and two-phase coding have been performed, so as to generate radio data (RDS data). Then, the RDS broadcasting frequency-modulates the amplitude-modulated sub-carrier wave with respect to a main carrier wave so that broadcasting is performed.

The tuner 12 is a front-end unit (F/E) that receives a broadcast signal with the antenna 10 and mixes the broadcast signal with a local oscillating signal so as to convert the broadcast signal into an intermediate frequency signal. For example, the tuner 12 receives an FM broadcast signal included in a predetermined broadcast band and then converts the FM broadcast signal into a predetermined intermediate frequency signal IF1. The tuner 22 generally has a configuration the same as that of the tuner 12. The tuner 22 receives an FM broadcast signal included in a predetermined broadcast band through the antenna 20 and then converts the FM broadcast signal into an intermediate frequency signal IF2.

The phase shifter 14 shifts a phase with respect to the intermediate frequency signal IF1 output from the one tuner 12. The phase shifter 24 shifts a phase with respect to the intermediate frequency signal IF2 output from the other tuner 22. The adder 30 adds (composites) the two-typed intermediate frequency signals IF1 and IF2 that have passed through the phase shifters 14 and 24, respectively. The phase diversity processing unit 32 sets a phase shift amount of at least one of the phase shifters 14 and 24 in order to maximize the amplitude of an intermediate frequency signal IF3, after the composition, output from the adder 30. Note that, in the described form of the present disclosure, the two phase shifters 14 and 24 are provided. These phase shifters 14 and 24 are used in order to adjust a relative phase difference between the two-typed intermediate frequency signals IF1 and IF2. Thus, when it is possible to adjust the phase difference with any one of the two phase shifters 14 and 24, the other may be omitted.

The demodulating unit 40 performs FM demodulation processing and stereo demodulation processing based on the intermediate frequency signal IF3, after the composition, output from the adder 30, or the intermediate frequency signals IF1 and IF2, before the composition, output from the phase shifters 14 and 24, respectively. Data after the FM demodulation, includes the RDS data including, for example, a PI code, program content identifying data (TYP), and alternative frequency (AF) data, superimposed. The amplifier 44 amplifies an audio signal to which the demodulating unit 40 has performed stereo demodulation, so that the speaker 46 outputs audio sound.

The RDS decoder 48 performs predetermined decoding processing with respect to the data to which the demodulating unit 40 has performed the FM demodulation, so as to restore the RDS data. The electric field intensity detecting unit 50 detects the electric field intensity of the broadcast signal, based on the intermediate frequency signal IF1 output from the one tuner 12 (or from both of the tuners 12 and 22). The noise component detecting unit 52 detects ultrasonic noise (USN) included in the intermediate frequency signal IF3 output from the adder 30. The ultrasonic noise is a noise component included in the side of high frequencies of a signal component to be demodulated. According to the present embodiment, for example, a bandpass filter extracts a noise component present, for example, in proximity to 80 kHz on the side of frequencies higher than the RDS data having a frequency of 57 kHz so as to detect ultrasonic noise.

The control unit 60 controls the entire radio receiver. The control unit 60 includes, for example, a CPU and a RAM or a ROM, and executes a predetermined computer program so as to perform a variety of operation, such as selecting operation that selects and receives a program. The control unit 60 also includes a switching processing unit 64 and an AF update processing unit 66 in order to perform the operation according to the embodiment of the present invention.

As an object to which the demodulating unit 40 performs the demodulation processing, the switching processing unit 64 sets (makes a switch) which one of the output of the adder 30, acquired by phase diversity (the intermediate frequency signal IF3), and the output of the phase shifter 14, acquired without the performance of the phase diversity (the intermediate frequency signal IF1), is used, based on a detection result acquired by the electric field intensity detecting unit 50 and a detection result acquired by the noise component detecting unit 52.

The AF update processing unit 66 acquires the alternative frequency data (AF data) in the RDS data included in the broadcast signal being received, and extracts a receiving frequency included in the acquired AF data so as to generate an alternative frequency list (an AF list). In addition, the AF update processing unit 66 issues an instruction for suspending phase diversity receiving operation with the adder 30, to the phase diversity processing unit 32, with predetermined timing (for example, with timing with which a regular time interval is repeated). After that, the AF update processing unit 66 issues an instruction for receiving a broadcast signal at each alternative frequency included in the AF list, to the tuner 22, and additionally performs quality checks to the respective broadcast signals so as to determine reception states of the respective broadcast signals. In forms of the present disclosure, a series of operation ranging from the generation of the AF list to the reception states of the broadcast signals at the alternative frequencies, is referred to as "AF update". Note that, the demodulating unit 40 performs the FM demodulation processing and the stereo demodulation processing based on the intermediate frequency signal IF1 output from the phase shifter 14 during the suspension of the phase diversity reception. Accordingly, the output of the audio sound from the speaker 46 remains. In addition, the AF update processing unit 66 compares the reception states of the respective broadcast signals at the alternative frequencies with a reception state of the broadcast signal being currently received. When the reception states of the broadcast signals at the alternative frequencies are more favorable, the AF update processing unit 66 issues an instruction for making a switch to the broadcast signals, to the tuners 12 and 22.

The above phase shifters 14 and 24, the adder 30, and the phase diversity processing unit 32 correspond to a compositing unit. The demodulating unit 40 corresponds to a demodulation processing unit. The noise component detecting unit 52 corresponds to a first detecting unit. The switching processing unit 64 corresponds to a switching unit. The electric field intensity detecting unit 50 corresponds to an electric field intensity detecting unit.

The radio receiver according to the present embodiment has the above configuration. Next, operation thereof will be described.

Figure 2A:
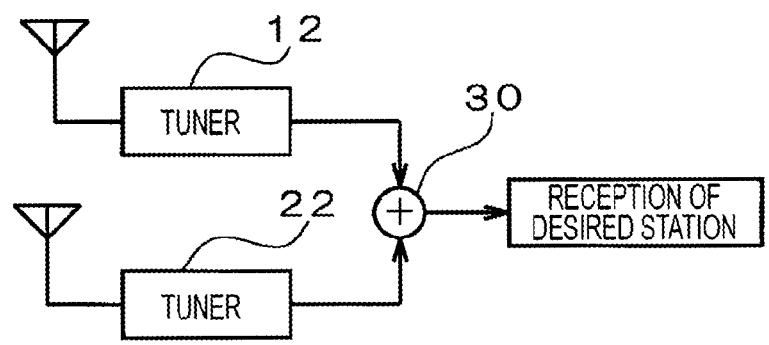
FIGS. 2A and 2B are diagrams illustrating a fundamental relationship between a phase diversity receiving operation and an alternative frequency (AF) update processing.
Figure 2B:
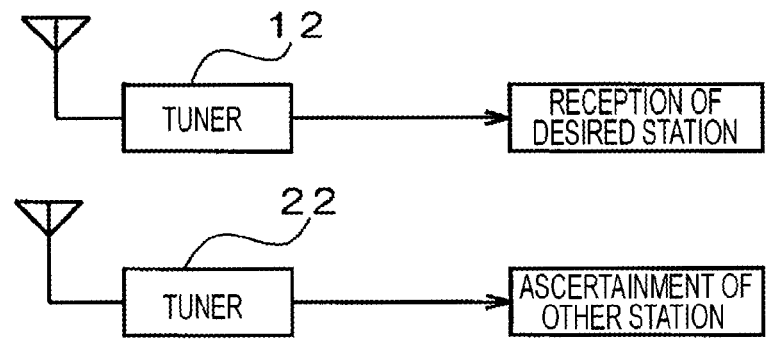

FIGS. 2A and 2B are diagrams illustrating a fundamental relationship between the phase diversity receiving operation and the AF update processing. As illustrated in FIG. 2A, the phase diversity receiving operation is normally performed with the two tuners 12 and 22. Demodulating operation is performed with the composited signal output from the adder 30 (the intermediate frequency signal IF3) so that the audio sound is output. As illustrated in FIG. 2B, the phase diversity reception is interrupted in a predetermined cycle (for example, at an interval of 1 second). The output of the audio sound continues with the one tuner 12, and additionally the AF update processing is performed with the other tuner 22 during predetermined time (for example, a few milliseconds).

In forms of the present disclosure, it is determined whether the phase diversity is performed, based on the detection result acquired by the electric field intensity detecting unit 50 and the detection result acquired by the noise component detecting unit 52, in parallel to the phase diversity receiving operation illustrated in FIG. 2A. When the phase diversity is not performed, the demodulating operation is performed with the one tuner 12.

Figure 3:
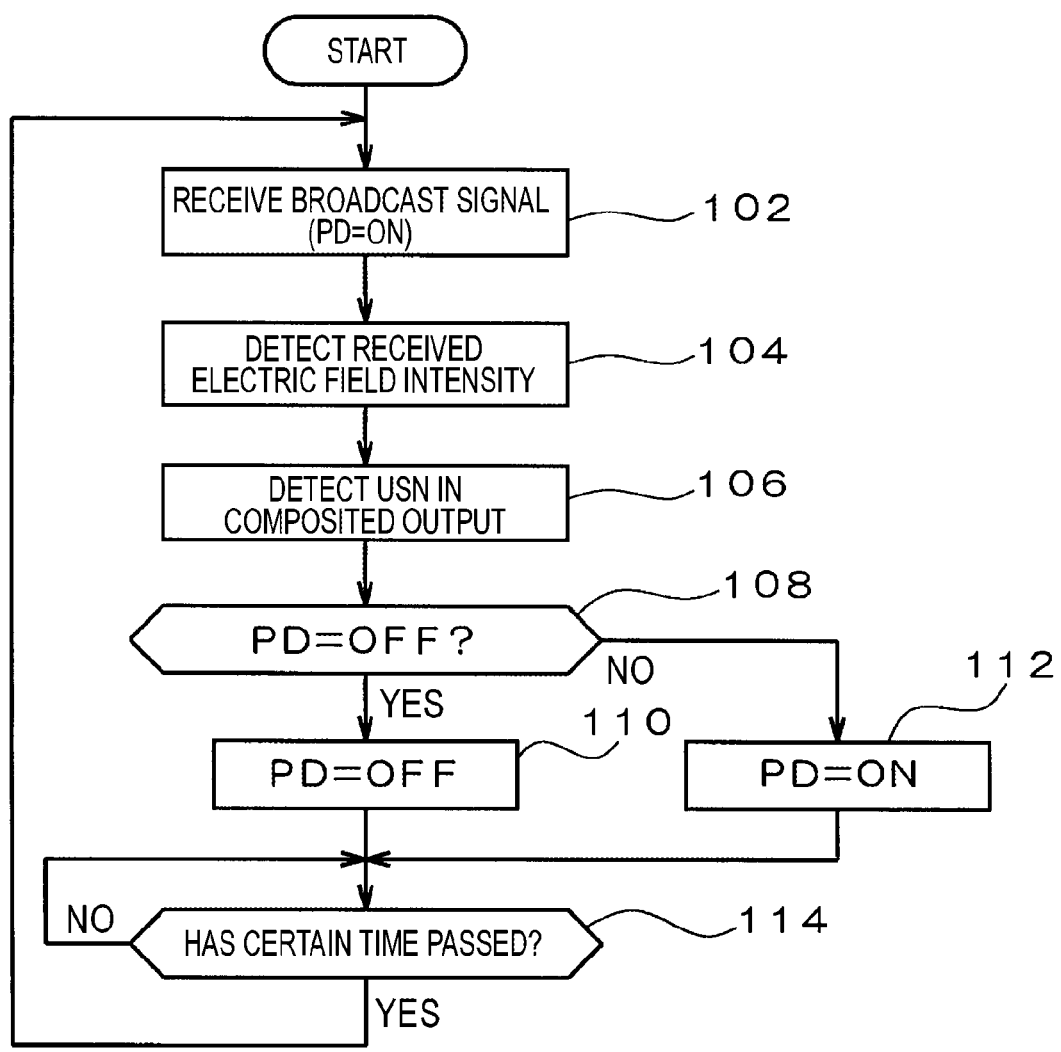
FIG. 3 is a flow chart of a receiving operation process of the radio receiver according to the present embodiment.

FIG. 3 is a flow chart of a receiving operation process of the radio receiver according to the present embodiment. In FIG. 3 and in FIGS. 4 and 5 to be described later, "PD=ON" represents that the receiving operation performed by the phase diversity is valid (during operation). "PD=OFF" represents that the receiving operation performed by the phase diversity is invalid (during suspension of the operation).

When starting the receiving operation, the radio receiver receives the broadcast signal by the phase diversity with the two tuners 12 and 22 (step 102). Next, the electric field intensity detecting unit 50 detects the electric field intensity (step 104). The noise component detecting unit 52 detects the ultrasonic noise (USN) included in the intermediate frequency signal IF3 output from the adder 30 (step 106).

Next, the switching processing unit 64 determines whether the receiving operation of the phase diversity is made to be invalid (PD=OFF), based on the detection result acquired by the electric field intensity detecting unit 50 and the detection result acquired by the noise component detecting unit 52 (step 108).

FIG. 4 is a setting table illustrating relationship between the detecting results acquired by the electric field intensity detecting unit 50 and the noise component detecting unit 52, and the validity/invalidity of the receiving operation performed by the phase diversity. In the FIG. 4, "S/M represents the electric field intensity detected by the electric field intensity detecting unit 50. "USN" represents the ultrasonic noise detected by the noise component detecting unit 52. "S1" and "S2" are two threshold values corresponding to the electric field intensity, and satisfy the following conditional expression: S1>S2. The one threshold value S2 corresponds to a second threshold value. "N1" and "N2" are two threshold values corresponding to the ultrasonic noise, and satisfy the following conditional expression: N1>N2. The one threshold value N1 corresponds to a first threshold value. Furthermore, "continuation" represents that a previous setting remains and switching of the validity/invalidity of the phase diversity is not performed.

When "PD=OFF" illustrated in FIG. 4 is satisfied, an affirmative judgement is made in determination at step 108. The switching processing unit 64 issues an instruction for making the receiving operation of the phase diversity invalid, to the phase diversity processing unit 32 (step 110). After that, the demodulation processing is performed with the output of the phase shifter 14 (the intermediate frequency signal IF1). The speaker 46 outputs audio sound acquired by the demodulation processing.

When "PD=ON" illustrated in FIG. 4 is satisfied, a negative judgement is made in the determination at step 108. The switching processing unit 64 issues an instruction for making the receiving operation of the phase diversity valid, to the phase diversity processing unit 32 (step 112). After that, the demodulation processing is performed with the output of the adder 30 (the intermediate frequency signal IF3). The speaker 46 outputs audio sound acquired by the demodulation processing.

Note that, at this point in time, the receiving operation of the phase diversity is valid in order to perform the detection of the ultrasonic noise at step 106 and the determination at step 108. This setting remains at step 112. A previous determination result at step 108 remains intact in the determination at step 108 when "continuation" illustrated in FIG. 4 is satisfied.

Next, the switching processing unit 64 determines whether certain time has passed (step 114). When the certain time has not passed, a negative judgement is made and this determination is repeated. When the certain time has passed, an affirmative judgement is made in the determination at step 114. Then, the processing goes back to step 102 and the receiving operation of the phase diversity is resumed so that, for example, the detection of the ultrasonic noise is repeatedly operated.

Figure 5:
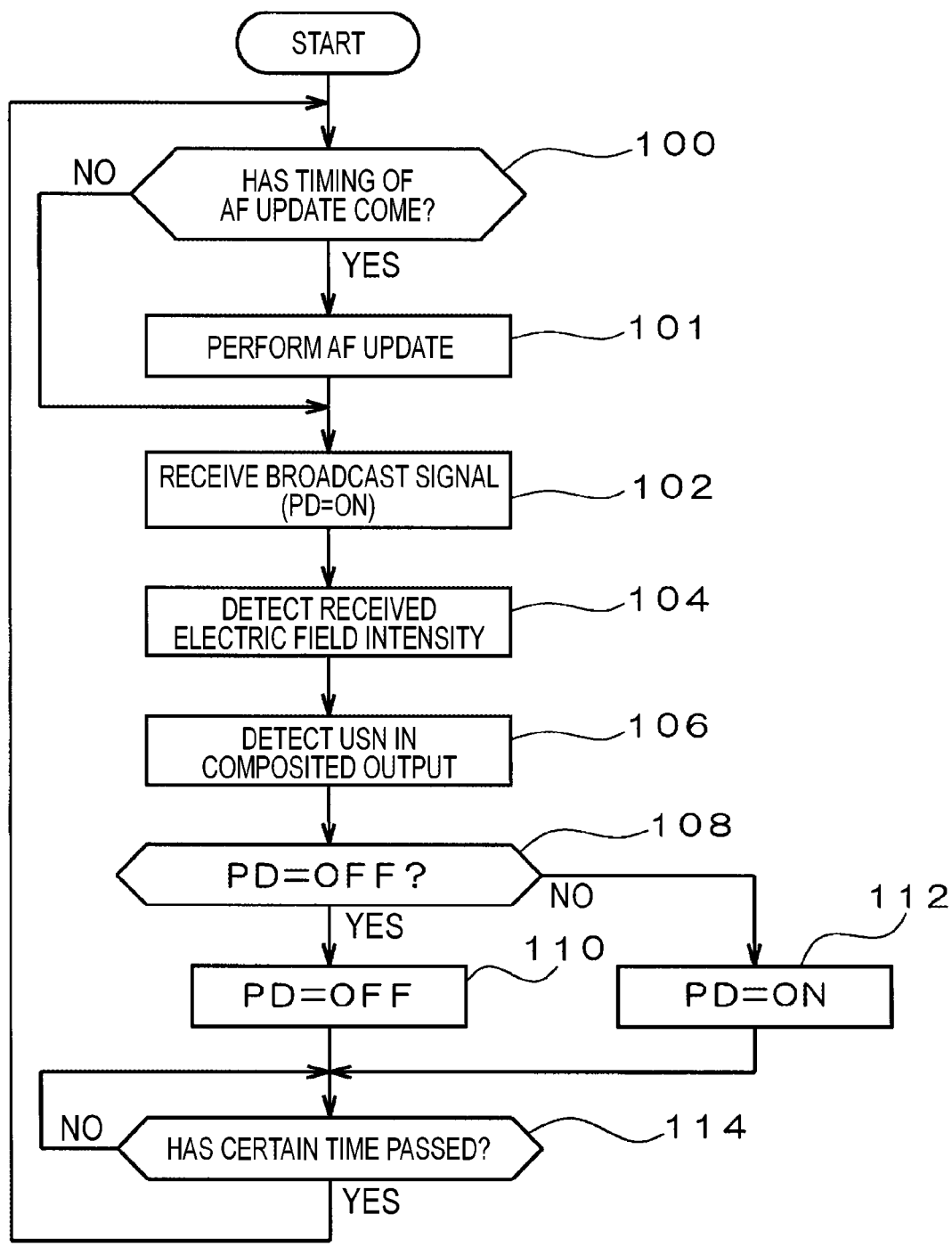
FIG. 5 is a flow chart of an operation process of a modification including the AF update processing combined.

FIG. 5 is a flow chart of an operation process of a modification including the AF update processing combined. Differently from the operation process illustrated in FIG. 3, steps 100 and 101 are added before step 102. Steps 100 and 101 that have been added, will be described below.

At step 100, the AF update processing unit 66 determines whether timing of the AF update has come. For example, when the AF update processing is performed at an interval of 1 second, it is determined whether the repeating timing has come. When the timing of the AF update processing has not come, a negative judgement is made in the determination at step 100 and the processing proceeds to the receiving operation of the phase diversity at step 102.

When the timing of the AF update has come, an affirmative judgement is made in the determination at step 100. In this case, the AF update processing unit 66 performs the AF update processing (step 101). When the AF update processing is completed, the processing proceeds to the receiving operation of the phase diversity at step 102.

In this manner, in the radio receiver according to the present embodiment, when the reception state degrades and the ultrasonic noise being the high frequency component of the demodulation signal increases, the compositing operation of the phase diversity being performed is canceled. Thus, a state in which only the noise component remains can be prevented from frequently occurring during operation of increasing sensitivity with the composition of a weak signal component included in the broadcast signal. As a result, sound swings are inhibited from occurring so that reception quality can improve. Particularly, a combination of the ultrasonic noise and the electric field intensity can securely prevent sound swings that occur in a case where reception electric field intensity decreases, from occurring.

The receiving operation of the phase diversity is temporarily canceled when the AF update processing is performed, and the receiving operation of the phase diversity is resumed when the AF update processing is completed. Even in this case, sound swings caused by the switching of the receiving operation of the phase diversity, can be prevented.

Figure 6:
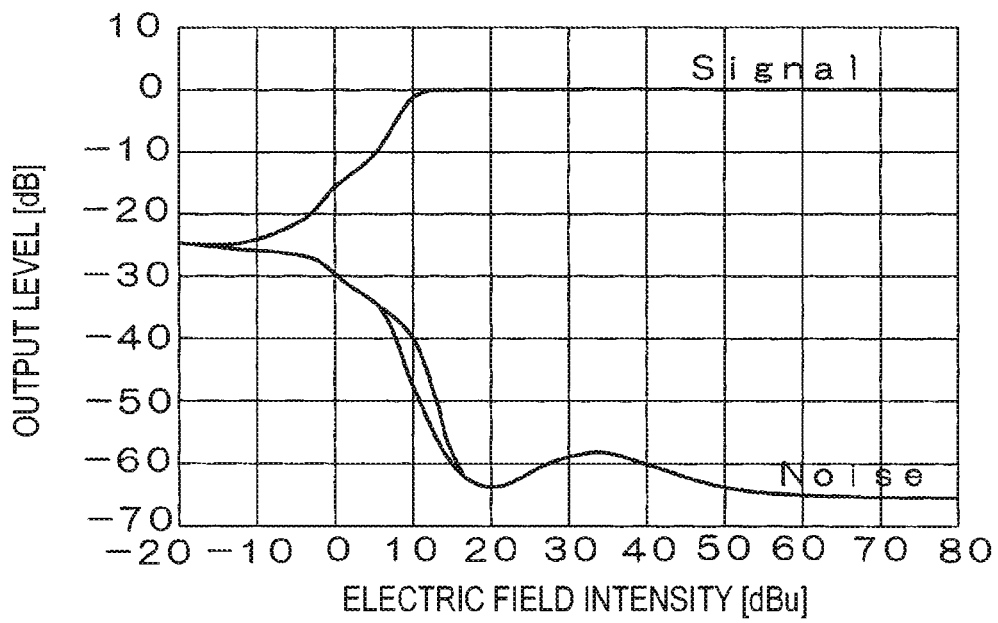
FIG. 6 is a graphical representation illustrating output waveforms in a case where the present disclosure has been applied.
Figure 7:
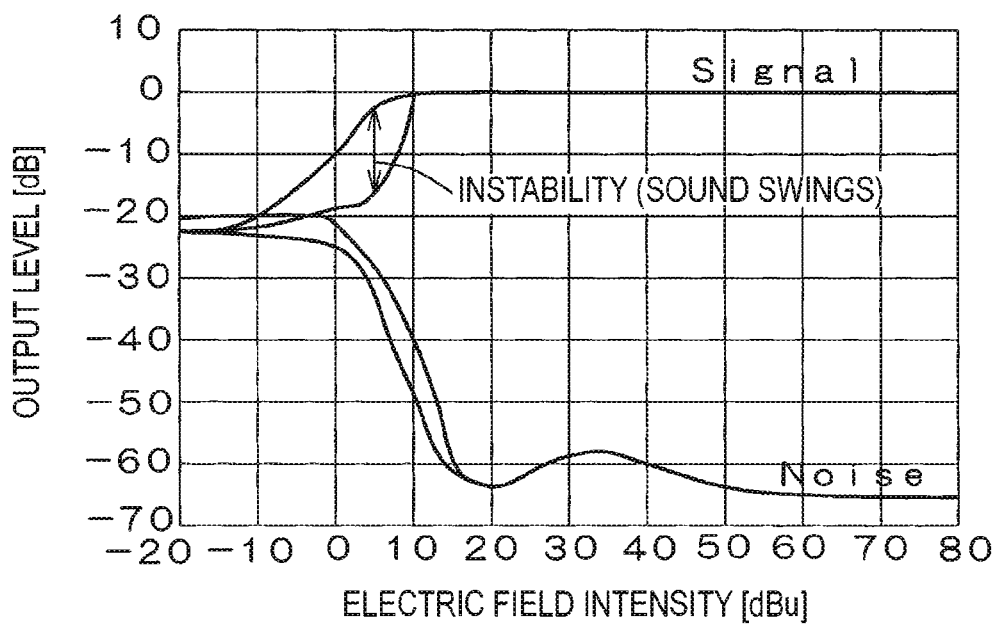
FIG. 7 is a graphical representation illustrating output waveforms in a case where the present disclosure has not been applied.

FIGS. 6 and 7 are graphical representations illustrating an effect of decreasing sound swings. FIG. 6 illustrates output waveforms in a case where the forms of present disclosure have been applied. FIG. 7 illustrates conventional output waveforms in a case where forms of the present disclosure have not been applied, for the comparison. In each of the graphical representations, a horizontal axis represents the electric field intensity of the received broadcast signal. A vertical axis represents the output level of the signal or the noise. According to the graphical representations, applying forms of the present disclosure can clearly, dramatically reduce instability of the output level of the signal (sound swings) when the electric field intensity decreases.

Note that, the present disclosure is not limited to the above embodiment, and various modifications can be made without departing from the scope of the spirit of the present invention. For example, the noise component detecting unit 52 detects the ultrasonic noise in the above embodiment, but may detect a noise component that is a component except the modulation signal transmitted from a broadcasting station (the broadcast signal), except the ultrasonic noise.

The increase of the ultrasonic noise determines the state where the signal component to be demodulated has been mutually canceled by the composition of the phase diversity in the above embodiment, but may determine the state, focusing on a phenomenon except the ultrasonic noise.

For example, a pilot signal detecting unit may be provided instead of the noise component detecting unit 52, and may detect a pilot signal having a frequency of 19 kHz included in the output of the adder 30 (the intermediate frequency signal IF3). FIG. 8 is a setting table illustrating relationship between detection results acquired by the electric field intensity detecting unit 50 and the pilot signal detecting unit, and validity/invalidity of the receiving operation of the phase diversity. In FIG. 8, "PS" represents the detection level of the pilot signal. "P1" and "P2" are two threshold values corresponding to the pilot signal, and satisfy the following conditional expression: P1<P2. The threshold value P1 corresponds to a third threshold value.

When a reception state degrades and a broadcast signal has mutually canceled due to the compositing operation of the phase diversity, a predetermined signal component of, for example, the pilot signal also disappears. In this case, the compositing operation is canceled so that a state where only a noise component remains can be prevented from frequently occurring during operation of increasing sensitivity with the composition of a weak signal component included in the broadcast signal. As a result, sound swings are inhibited from occurring so that reception quality can improve.

A frequency offset being a difference between a receiving frequency set in the tuner 12 or 22 and the frequency of a signal practically received by the tuner 12 or 22, may be used as the phenomenon except the ultrasonic noise.

For example, a frequency offset detecting unit may be provided instead of the noise component detecting unit 52, and may detect the frequency offset output from the tuner 12 or 22. Note that, a method that has been conventionally performed, can be used for a configuration itself of detecting the frequency offset. FIG. 9 is a setting table illustrating a relationship between detection results acquired by the electric field intensity detecting unit 50 and the frequency offset detecting unit, and validity/invalidity of the receiving operation by the phase diversity. In FIG. 9, "FO" represents the detection level of the frequency offset. "F1" and "F2" are two threshold values corresponding to the pilot signal, and satisfy the following conditional expression: F1>F2. The threshold value F1 corresponds to a fourth threshold value.

A case where a broadcast signal to be demodulated is mutually canceled due to the compositing operation of the phase diversity, is when the broadcast signal being a signal before the composition, cannot be acquired. In this case, the frequency offset being a difference between the frequency of the practically received signal and a set receiving frequency, increases. Therefore, examining the above frequency offset can prevent a state where only a noise component remains, from frequently occurring, during operation of increasing sensitivity with the composition of a weak signal component included in the broadcast signal. As a result, sound swings are inhibited from occurring so that reception quality can improve.

The detection result of the ultrasonic noise, the pilot signal, or the frequency offset, and the detection result of the electric field intensity are combined in the above embodiment. The operation according to forms of the present disclosure may be performed based on only the detection result of the ultrasonic noise, the pilot signal, or the frequency offset. Specifically, only "S2 S/M" including conditions in a rightmost column in the setting tables in FIGS. 4, 8, and 9, may be used. "Continuation" included in the tables may be replaced with "PD=ON" so that details of the setting tables may be simplified and simplification of the processing may be achieved.

The determination of the timing of the AF update at step 100 and the determination of the certain time passage at step 114 are individually performed in the operation process illustrated in FIG. 5. The timing of the certain time passage and the timing of the AF update processing may be synchronized so that the determination at step 100 may be omitted. In this case, the AF update processing at step 101 is at least performed before step 102.

The radio receiver that receives the RDS broadcasting, has been described in the above embodiment. However, if a radio receiver that receives FM broadcasting excluding RDS data, and other receiving devices, include two tuners or at least three tuners and perform the receiving operation of the phase diversity, the present disclosure can be applied to the radio receiver and the other receiving devices.

As described above, according to forms of the present disclosure, compositing operation is canceled so that a state where only a noise component remains can be prevented from frequently occurring during operation of increasing sensitivity with the composition of a weak signal component included in the broadcast signal in a case where a reception state degrades, a broadcast signal mutually cancels due to the compositing operation, a signal after the composition, includes no signal component to be demodulated and includes only the noise component remaining. As a result, sound swings are inhibited from occurring so that reception quality can improve.

It is therefore intended that the foregoing detailed description be regarded as illustrative rather than limiting, and that it be understood that it is the following claims, including all equivalents, that are intended to define the spirit and scope of this invention.

What is claimed is:

1. A receiving device comprising:
   a plurality of tuners configured to receive a broadcast signal through separate antennas;
   a compositing unit configured to adjust and composite a phase of an output signal of each tuner of the plurality of tuners;
   a demodulation processing unit configured to perform demodulation processing to an input signal;
   a first detecting unit configured to detect a predetermined noise component included in composited output of the compositing unit; and
   a switching unit configured to:
      set the signal before the composition performed by the compositing unit to be an object to which the demodulation processing unit performs the demodulation processing when the predetermined noise component detected by the first detecting unit exceeds a first threshold value, and
      set the signal after the composition performed by the compositing unit to be the object to which the demodulation processing unit performs the demodulation processing when the predetermined noise component does not exceed the first threshold value.

2. The receiving device according to claim 1, further comprising:
   an electric field intensity detecting unit configured to detect electric field intensity of the broadcast signal,
   wherein the switching unit is configured to set the signal before the composition performed by the compositing unit to be the object to which the demodulation processing unit performs the demodulation processing when the electric field intensity detected by the electric field intensity detecting unit does not exceed a second threshold value and the predetermined noise component detected by the first detecting unit exceeds the first threshold value.

3. The receiving device according to claim 1,
   wherein the predetermined noise component is a noise component included in a side of high frequencies of a signal component to be demodulated.

4. The receiving device according to claim 3,
   wherein the predetermined noise component is ultrasonic noise being a high frequency component of a demodulation signal.

5. The receiving device according to claim 1, further comprising a control unit configured to:
   suspend compositing operation performed by the compositing unit temporarily with predetermined repeating timing and perform separate receiving operation in each of the plurality of tuners, and
   resume the compositing operation performed by the compositing unit after the performance of the separate receiving operation.

6. The receiving device according to claim 5,
   wherein the switching unit is configured to set the signal after the composition performed by the compositing unit to be the object to which the demodulation processing unit performs the demodulation processing when the control unit resumes the compositing operation performed by the compositing unit.

7. The receiving device according to claim 1,
   wherein the switching unit is configured to set the signal after the composition performed by the compositing unit to be the object to which the demodulation processing unit performs the demodulation processing, with predetermined timing, after setting the signal before the composition performed by the compositing unit to be the object to which the demodulation processing unit performs the demodulation processing.

8. A receiving device comprising:
   a plurality of tuners configured to receive a broadcast signal through separate antennas;
   a compositing unit configured to adjust and composite a phase of an output signal of each tuner of the plurality of tuners;
   a demodulation processing unit configured to perform demodulation processing to an input signal;
   a first detecting unit configured to detect a predetermined signal component included in composited output of the compositing unit; and
   a switching unit configured to:
      set the signal before the composition performed by the compositing unit to be an object to which the demodulation processing unit performs demodulation processing when the predetermined signal component detected by the first detecting unit does not exceed a first threshold value, and
      set the signal after the composition performed by the compositing unit to be the object to which the demodulation processing unit performs the demodulation processing when the predetermined signal component has exceeded the first threshold value.

9. The receiving device according to claim 8, further comprising:
   an electric field intensity detecting unit configured to detect electric field intensity of the broadcast signal,
   wherein the switching unit is configured to set the signal before the composition performed by the compositing unit to be the object to which the demodulation processing unit performs the demodulation processing when the electric field intensity detected by the electric field intensity detecting unit does not exceed a second threshold value and the predetermined signal component detected by the first detecting unit has not exceeded the first threshold value.

10. The receiving device according to claim 8,
    wherein the predetermined signal component is a pilot signal included in a broadcast signal of FM broadcasting.

11. The receiving device according to claim 8, further comprising a control unit configured to:
    suspend compositing operation performed by the compositing unit temporarily with predetermined repeating timing and perform separate receiving operation in each tuner of the plurality of tuners, and
    resume the compositing operation performed by the compositing unit after the performance of the separate receiving operation.

12. The receiving device according to claim 11,
    wherein the switching unit is configured to set the signal after the composition performed by the compositing unit to be the object to which the demodulation processing unit performs the demodulation process when the control unit resumes the compositing operation performed by the compositing unit.

13. The receiving device according to claim 8,
    wherein the switching unit is configured to set the signal after the composition performed by the compositing unit to be the object to which the demodulation processing unit performs the demodulation processing, with predetermined timing, after setting the signal before the composition performed by the compositing unit, to be the object to which the demodulation processing unit performs the demodulation processing.

14. A receiving device comprising:
a plurality of tuners configured to receive a broadcast signal through separate antennas;
a compositing unit configured to adjust and composite a phase of an output signal of each tuner of the plurality of tuners;
a demodulation processing unit configured to perform demodulation processing to an input signal;
a first detecting unit configured to detect a frequency offset that is a difference between a receiving frequency set in the plurality of tuners and the frequency of the signal practically received in the plurality of tuners; and
a switching unit configured to:
set the signal before the composition performed by the compositing unit to be an object to which the demodulation processing unit performs the demodulation processing when the frequency offset detected by the first detecting unit exceeds a first threshold value, and
set the signal after the composition performed by the compositing unit to be the object to which the demodulation processing unit performs the demodulation processing when the frequency offset does not exceed the first threshold value.

15. The receiving device according to claim 14, further comprising:
an electric field intensity detecting unit configured to detect electric field intensity of the broadcast signal,
wherein the switching unit is configured to set the signal before the composition performed by the compositing unit, to be the object to which the demodulation processing unit performs the demodulation processing when the electric field intensity detected by the electric field intensity detecting unit does not exceed a second threshold value and the frequency offset detected by the first detecting unit exceeds the first threshold value.

16. The receiving device according to claim 14, further comprising a control unit configured to:
suspend compositing operation performed by the compositing unit temporarily with predetermined repeating timing and perform separate receiving operation in each tuner of the plurality of tuners, and
resume the compositing operation performed by the compositing unit after the performance of the separate receiving operation.

17. The receiving device according to claim 16,
wherein the switching unit is configured to set the signal after the composition performed by the compositing unit to be the object to which the demodulation processing unit performs the demodulation process when the control unit resumes the compositing operation performed by the compositing unit.

18. The receiving device according to claim 14,
wherein the switching unit is configured to set the signal after the composition performed by the compositing unit to be the object to which the demodulation processing unit performs the demodulation processing, with predetermined timing, after setting the signal before the composition performed by the compositing unit, to be the object to which the demodulation processing unit performs the demodulation processing.

* * * * *